United States Patent
DiVito et al.

(10) Patent No.: US 7,586,725 B2
(45) Date of Patent: Sep. 8, 2009

(54) METHOD OF PROVIDING A SECONDARY MEANS OF OVERLOAD PROTECTION AND LEAKAGE CURRENT PROTECTION IN APPLICATIONS USING SOLID STATE POWER CONTROLLERS

(75) Inventors: Rocco DiVito, Toronto (CA); Zhenning Z. Liu, Mississauga (CA); Randy J. Fuller, Hillsburgh (CA); That Nguyen, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/780,386

(22) Filed: Jul. 19, 2007

(65) Prior Publication Data

US 2009/0021874 A1   Jan. 22, 2009

(51) Int. Cl.
- *H02H 3/08* (2006.01)
- *H02H 9/02* (2006.01)
- *H02H 5/04* (2006.01)

(52) U.S. Cl. ................................ 361/93.1; 361/103
(58) Field of Classification Search ............... None
See application file for complete search history.

(56) References Cited

U.S. PATENT DOCUMENTS

| 4,184,186 A * | 1/1980 | Barkan ................... 361/10 |
| 4,656,365 A | 4/1987 | Billings |
| 5,786,975 A * | 7/1998 | Duncan et al. ........... 361/111 |
| 6,518,731 B2 * | 2/2003 | Thomas et al. .......... 320/136 |
| 6,753,723 B2 * | 6/2004 | Zhang ..................... 327/540 |
| 2005/0146824 A1 * | 7/2005 | Borrego Bel ............ 361/103 |
| 2005/0185353 A1 | 8/2005 | Rasmussen et al. |

* cited by examiner

*Primary Examiner*—Albert W Paladini
*Assistant Examiner*—Dharti Patel
(74) *Attorney, Agent, or Firm*—Oral Caglar, Esq.

(57) ABSTRACT

The present invention provides an overload protection circuit having a first switch connected at a first side to a source of electrical power and at a second side to a load, the switch having on and off modes and a second switch connected between the first switch second side and ground, the second switch having on and off modes. A control module generates at least one signal controlling the first switch mode and the second switch mode wherein the signal turns the second switch to the off mode when turning the first switch to the on mode and the signal turning the second switch to an on mode when turning the first switch to the off mode. Both over current and leakage protection are thereby achieved.

14 Claims, 2 Drawing Sheets

US 7,586,725 B2

METHOD OF PROVIDING A SECONDARY MEANS OF OVERLOAD PROTECTION AND LEAKAGE CURRENT PROTECTION IN APPLICATIONS USING SOLID STATE POWER CONTROLLERS

BACKGROUND OF THE INVENTION

The present invention generally relates to solid state power controllers, and more particularly to secondary overload and alternate leakage current protection for solid state power controllers.

In electrical power distribution systems, such as those used to supply power to electrical loads on commercial aircraft, solid state power controller (SSPC) technology is gaining acceptance as an alternative to the combination of conventional electro-mechanical relays and circuit breakers. The advantages of SSPCs include their light weight, lower maintenance, better reliability, and small size. However, the "fail-closed" nature of the solid state device can be a safety concern. This concern has become a critical element for the certification of the SSPC technology for commercial aircraft and thus, a secondary means of protection is usually required.

Besides the "fail-closed" issue, leakage current is another potential disadvantage with SSPCs. When an SSPC channel is in the "open" state, maintenance personnel may come into contact with the open end of the power channel and get startled due to possible excessive leakage current. This potential safety risk becomes apparent during maintenance activities such as replacing an aircraft load that is connected to the SSPC channel with the excessive leakage current. The leakage current problem can be addressed by introducing an SSPC output clamping circuitry, which diverts the leakage current directly to the aircraft ground.

Safety and reliability requirements often necessitate the use of a secondary protection mechanism (e.g. a fuse) in series with the SSPC. Ideally, such a protection mechanism would provide the same level of wire protection, in terms of the energy rating, when the SSPC fails (closed). At the same time, this secondary protection mechanism should not interact with the SSPC's primary protection mechanism. That is, the secondary protection mechanism should interrupt power when required to avoid damage to downstream wiring, but should not interrupt power before the SSPC interrupts power during an over current/overload event. Because of this requirement, the selection of such a secondary protection mechanism and its coordination with the SSPC main protection mechanism (trip engine) can add significant complexities to the application of SSPC technology to commercial aircraft.

In particular, the secondary protection, such as a fusing means, must be carefully selected or designed to provide adequate protection to feeder wires yet also avoid the situation where the fusing means blows open before the SSPC trip engine can respond to circuit over current. There must be sufficient margin between the SSPC trip characteristic, and the downstream feeder wire's smoke limit to fit a fusing means characteristic for the secondary protection. In present applications, the margin has been realized by trade offs between fusing characteristics and minimum feeder wire sizes, often resulting in larger feeder wires and thus a heavier system distribution system. Another consideration is the "thermal memory" effect of the secondary protection, which needs to be accounted for by the SSPC trip engine. This adds even more complexity to the design of the SSPC trip engine, the selection of the secondary protection, and the selection of the feeder wire size. One consequence of the thermal memory effect of the secondary protection may be the use of an increased feeder wire size, which undesirably adds to the weight, volume and cost of the power distribution system.

As can be seen, there is a need for a way to provide a secondary means of overload protection for electrical power distribution systems containing SSPCs, with a closed-state failure mode. There is also a need for a circuit that can provide leakage current protection in electrical power distribution systems having SSPCs. There is a further need for a circuit that can facilitate the design of an SSPC trip engine by simplifying the selection of the secondary protection mechanism and the feeder wire size.

SUMMARY OF THE INVENTION

In one aspect of the present invention, an overload protection circuit comprises a first switch connected at a first side to a source of electrical power and at a second side to a load, the switch having on and off modes; a second switch connected between the first switch second side and ground, the second switch having on and off modes; and a control module for generating at least one signal controlling the first switch mode and the second switch mode, at least one signal turning the second switch to the off mode when turning the first switch to the on mode and at least one signal turning the second switch to an on mode when turning the first switch to the off mode.

In another aspect of the present invention, a method of protecting an electrical power distribution system comprises receiving a command to open or close a first switch, the first switch being connected between a source of electrical power and a load; and if the received command is a close command, determining if an overload situation is present and if not, closing the first switch and opening a second switch, the second switch being connected between the first switch and ground.

In a further aspect of the present invention, a leakage current protection circuit comprises a solid state power controller connected to a source of electrical power and having an output, the solid state power controller having an ON state and an OFF state, wherein electrical power is primarily transferred to the output during the ON state and wherein a leakage current is transferred to the output during the OFF state; a switch connected between the solid state power controller output and a ground potential, the switch having an ON state and an OFF state; and a controller coupled to the switch and causing the switch to be in the ON state whenever the solid state power controller is in the OFF state, wherein the leakage current from the solid state power controller passes through the switch to the ground potential.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be advantageously used to provide secondary overload protection and leakage current protection in electrical power distribution systems which employ SSPCs. It may be particularly advantageous in applications such as avionics, where it is desirable to minimize the weight and volume of the electrical power distribution system.

Embodiments of the present invention may provide both secondary overload protection as well as leakage current protection in a single SSPC output clamping circuit. In the prior art, SSPC secondary overload protection circuits were difficult to design and did not also provide leakage protection. Furthermore, the present invention may provide a SSPC output clamping circuit having a low impedance switch connected to ground that provides overload and leakage current protection. Prior art SSPC secondary overload protection circuits did not provide a low impedance switch connected to ground providing overload and leakage current protection.

Figure 1:
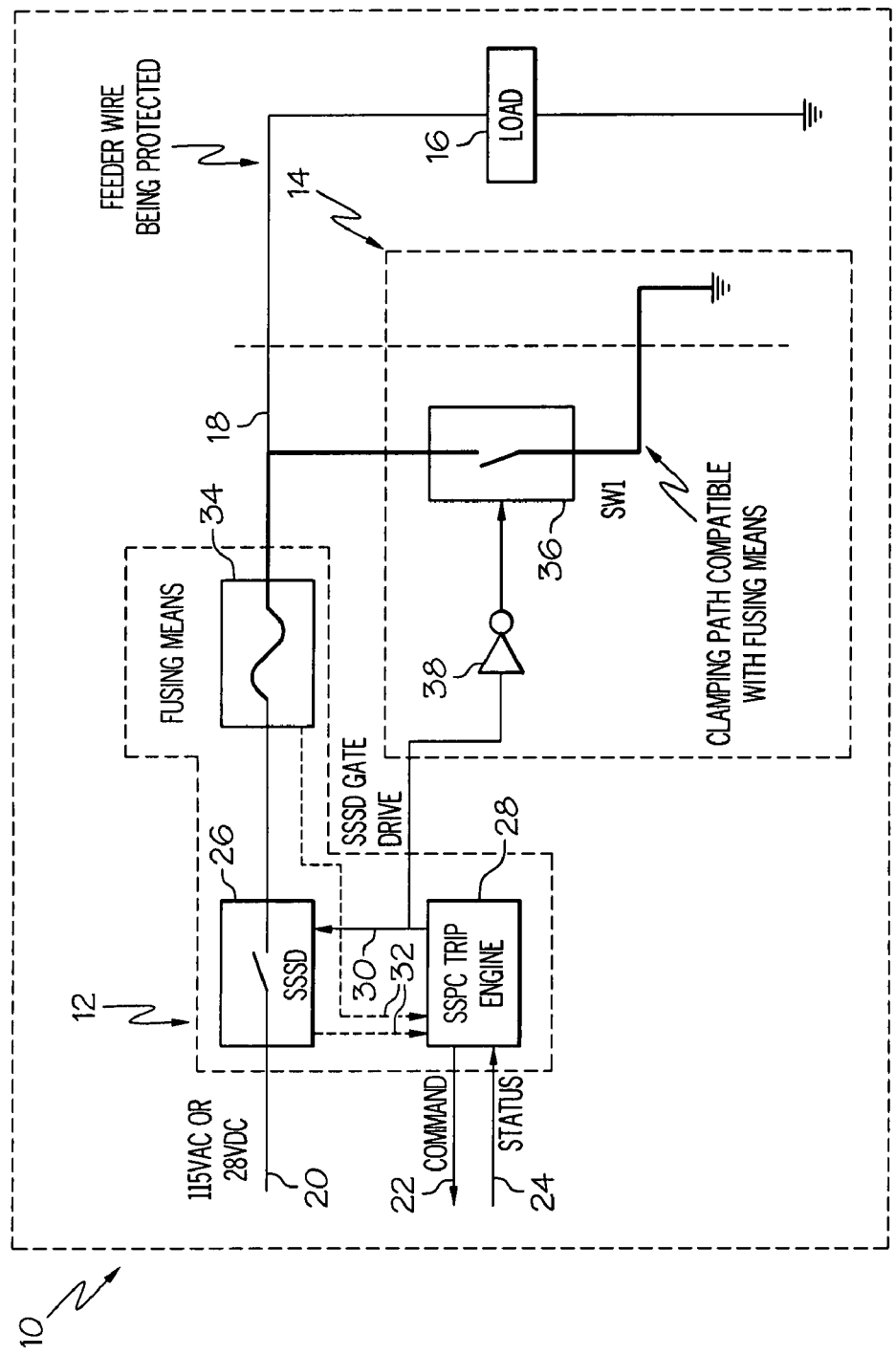
FIG. 1 is conceptual block diagram of a solid state power controller clamping circuit in accordance with one aspect of the present invention.

FIG. 1 shows a conceptual block diagram of an electrical power distribution system 10 that may include an SSPC 12 and an SSPC output clamping circuit 14, in accordance with an embodiment of the invention. The electrical power distribution system 10 may be, for example, an electrical power distribution system in an aircraft. The SSPC 12 may be connected to one or more loads 16 through one or more feeder wires 18. The electrical power distribution system 10 may include a source of electrical power (not shown) through an input line 20. This electrical power may be AC or DC, for example, 115 Volts AC or 28 Volts DC.

The electrical power distribution system 10 also may transfer information between the SSPC 12 and an external control unit (not shown) through input 22 and output 24. In one embodiment, input 22 may transfer commands to the SSPC 12 and output 24 may carry status information from the SSPC 12 to the external control unit. In general, the function of the SSPC output clamping circuit 14 is to provide both, overload and leakage current protections, as described in more detail below.

SSPC 12 may include a solid state switching device (SSSD) 26, which may be used to switch on and off AC or DC electrical power from the input line 20 to the feeder wire 18. A fusing means 34 may be connected between the SSPC 12 and the feeder wire 18 to provide short circuit protection in case of a short-circuit SSSD 26, as described in more detail below. The SSSD 26 may include a plurality of conventional power metal oxide semiconductor field effect transistors (MOSFETs), or may comprise other kinds of power switching devices such as thyristors, silicon controlled rectifiers (SCRs) or insulated gate bipolar transistors (IGBTs). The fusing means may comprise a fuse, fusible link, current sense resistor, bonding wires in SSSD, or other similar device.

The SSPC 12 may also include an SSPC trip engine 28 which may be responsible for SSSD 26 on/off control (commutation) and feeder wire 18 protection. In particular, the SSPC trip engine 28 may drive the SSSD 26 to provide the required power commutation according to a received on/off command from input line 22 during normal load conditions. This may be accomplished by a SSSD gate drive signal sent through an SSSD gate drive output 30.

During overload conditions, the SSPC trip engine 28 may turn off the SSSD 26 according to predetermined trip characteristics based on an estimated thermal energy level within the protected feeder wire 18 and load 16. This estimated thermal energy level may be based on a current sense signal received through a current sense input 32 received from the fusing means 34. The current sense signal may be provided by a shunt resistor (not shown) in the fusing means 34 or alternatively in the SSSD 26. The SSPC trip engine also may provide feedback signals through output 24 to an aircraft load management system (not shown) such as load and trip status of the associated load channel.

As discussed above, in prior art secondary overload protection devices, the selection of the size of the fusing means 34 needed to be carefully sized according to the current rating of the feeder wire 18, while the SSPC trip engine 28 has to be designed to coordinate well with the fusing means trip characteristics and the feeder wire 18 to avoid the situation where the fusing means blows open before the SSPC trip engine 28 can respond to circuit overload. In accordance with the present invention, the output clamping circuit 14 may eliminate this problem.

Output clamping circuit 14 may include a low impedance switch 36 connected between the load side of the fusing means 34 and ground. Low impedance switch 36 may comprise a solid state device or an electromechanical device. The state of low impedance switch 36 may be controlled by the SSSD gate drive signal from output 30, which may be connected to the input of an inverter 38. The output signal of the inverter 38 may turn low impedance switch 36 on and off. Because of inverter 38, when the gate drive signal at output 30 is active (e.g. +15V) SSSD 26 will be commanded to be closed, while the inverter 30 output will be inactive (e.g. 0V) thus commanding the low impedance switch 36 to be in the open state. Conversely, when the gate drive signal at output 30 is inactive (e.g. 0V) SSSD 26 will be commanded to be open, while the inverter 30 output will be active (e.g. 15V) thus commanding the low impedance switch 36 to be in the closed state.

The SSPC trip engine 28 may command the SSSD 26 to open in two different circumstances. The first circumstance may be during normal operation when an open command is received from input 22; while the second circumstance may be in the case of an over current situation as indicated by a current sense signal from the input 32. In the over current condition, with low impedance switch 36 closed, the output of the SSPC 12 may be forced (shorted) to the ground (i.e. the load 16 return). As a result, the feeder wire 18 may automatically be protected from any potential electrical overstress.

In the situation where the SSSD 26 fails closed and the associated load 16 needs to be switched off due to either a turn-off command or an over current fault, the SSSD gate drive signal that would normally turn SSSD off may close low impedance switch 36, forming a short circuit path to the SSPC 12 input power. This may force the fusing means 34, or any similar protection mechanism in the short circuit, to eventually open up. During this entire process, the feeder wire 18 may thereby be protected.

In normal operating situations, when SSPC 12 receives a command to open SSSD 26, low impedance switch 36 may be closed. In this state, low impedance switch 36 will fulfill the leakage current clamping function because any leakage current through SSSD 26 while in the open state may be shunted to ground through the low impedance switch 36. The value of the impedance required by low impedance switch 36 to divert SSSD 26 leakage current during the commutated OFF state may depend on the technology used for the SSSD 26. Typical leakage currents for semiconductors such as MOSFETS in AC applications can be in excess of 6 milliamps (ma). Typically, less than 1 ma leakage current to external paths is considered safe. The difference may be required to be diverted away from external paths through means such as resistors or switches between line and ground. Normally, the impedance of the clamping circuit required to divert the excess leakage current may be in the range of 1 ohm to 1 Kohm. However, due to the nature of low impedance switch 36, where its current handling capability may be determined by the fault current to be conducted when providing the secondary means of overload protection, the impedance of the branch circuit is preferably orders of magnitude less than the conventional impedances (e.g. less than 50 milli-ohms) and its value may depend on the SSPC 28 rating and the characteristics of the protected feeder wire 18 and load 16. Preferably, the impedance of the branch circuit may be sized such that at least 50% of the SSPC's output current is diverted to ground, thereby alleviating the constraints on coordinating the secondary means of protection with the SSPC's 12 trip characteristics and the downstream feeder wire characteristics.

The fusing means 34, or other secondary protection mechanism, in accordance with the present invention, does not need to be sized according to the feeder wire 18 rating. The selection of the secondary protection mechanism becomes independent of the feeder wire rating. The secondary protection mechanism only needs to be sized according to the current rating of the low impedance switch 36 and its associated printed wiring board (PWB) trace in the clamping path, so that in case the SSSD 26 fails closed, the secondary protection mechanism will take effect before the low impedance switch 36 and associated PWB trace can be damaged.

In accordance with one embodiment of the invention, the fusing means 34, or other dedicated device may be eliminated from the electrical power distribution system 10 as a secondary means of protection. The SSPC's 12 existing current sensing resistor and the wire bonds inside the SSSD 26, for example, can all serve the purpose, as long as they are sized properly (have a lower current rating) as compared to the current ratings of the low impedance switch 36 and the associated PWB trace in the clamping path. With or without the fusing means 34, the activation of the secondary protection becomes a more controlled event, rather than an undetermined situation that depends on the fault current level.

Figure 2:
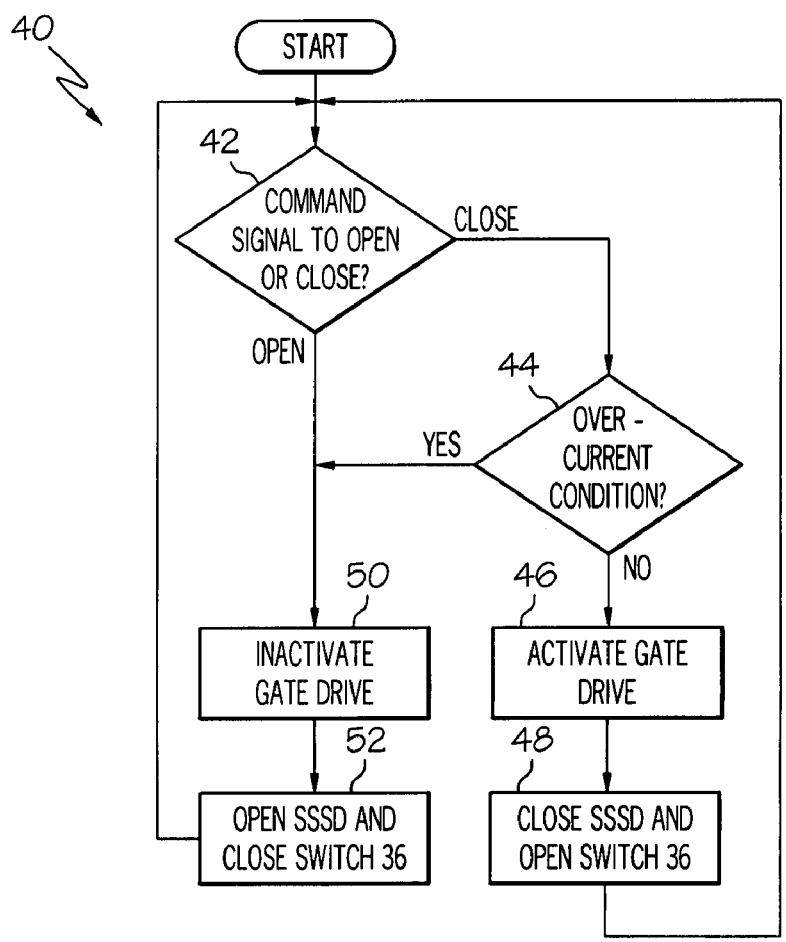
FIG. 2 is a flow chart of a method of providing secondary overload and leakage current protection in accordance with one embodiment of the present invention.

FIG. 2 shows a flowchart of a process 40 for providing secondary overload and leakage current protection in accordance with one embodiment of the invention. Step 42 may determine whether there is a command signal (which may be received from input 22) to open or close SSSD 26. If the command signal is to close SSSD 26, step 44 determines if there is an over current situation. This determination of an over current situation may be made by, for example, the SSPC trip engine 28 determining if a predetermined threshold has been exceeded by a current sense signal received through input 32. If there is not an over current situation, step 46 will activate the gate drive signal, which may be produced, for example, by trip engine at output 30. The gate drive signal will have the effect of closing the SSSD 26 and opening the low impedance switch 36, as indicated in step 48. The process 40 will then return to step 42. If the most recent command is still a close command, or if there are no additional commands, indicating that the SSSD 26 should remain closed, step 42 will direct the process 40 again to step 44 to determine if an over current situation exists. If not, the process continues through steps 46 and 48 and back to step 42 repeatedly until there is a change in the state of the system. The foregoing sequence of steps may be considered to be normal operating mode.

If, instead, step 44 determined that there is an over current situation, the process 40 will move to step 50. Alternatively, if step 42 had determined that there was a command to open SSSD 26, the process 40 would likewise move to step 50. Step 50 will inactivate the gate drive signal, for example at output 30. This will have the simultaneous effect of opening the SSSD 26 and closing the low impedance switch 36, as indicated in step 52. The process 40 will then move back to step 42 and steps 42, 50 and 52 will repeat until there is a new command. While not shown here, it is noted that if, while in this state, the SSSD 26 fails in a closed state, the low impedance switch 36 is already closed thereby protecting the feeder wire 18.

With the electrical power distribution system 10 of the present invention, because the size of the secondary protection mechanism is independent of the feeder wire 18 rating, the feeder wire 18 size, and therefore its weight, may be reduced. This is because there will be no need to build in sufficient margin between the SSPC 12 trip characteristic and the feeder wire 18 smoke limit to fit a fusing characteristic for the secondary protection.

Thus, it may be seen that the present invention may provide electrical power distribution systems using SSPCs with both secondary overload protection and leakage current protection. The present invention may also be able to perform these protection functions even where the SSSD 26 fails in the closed state.

It should be understood, of course, that the foregoing relates to exemplary embodiments of the invention and that modifications may be made without departing from the spirit and scope of the invention as set forth in the following claims.

We claim:

1. An overload protection circuit comprising:
    a first switch connected at a first side to a source of electrical power and at a second side to a feeder wire, said first switch having ON and OFF modes, wherein a leakage current is transferred to ground potential during a first switch OFF mode;
    a second switch connected between said first switch second side and ground, said second switch having ON and OFF modes;
    the feeder wire carrying current in a span between the second switch and a load;
    the feeder wire having a predetermined smoke limit; and
    a control module for generating at least one signal responsive to a thermal energy level within the feeder wire in excess of the smoke limit and controlling a first switch mode and a second switch mode, said at least one signal turning said second switch to said OFF mode when turning said first switch to said ON mode and said at least one signal turning said second switch to an ON mode when turning said first switch to said OFF mode, wherein the leakage current from said first switch passes through said second switch to said ground potential.

2. The overload protection circuit of claim 1 further comprising:
    a current sensor generating a current sense signal proportional to a current passing through said first switch when in said ON mode;
    said control module receiving said current sense signal and in response to a current signal indicating an over current condition, turning said first switch to an OFF mode and said second switch to an ON mode, thereby shunting said current passing through said first switch to ground and preventing a large portion of the said sensed current from reaching said load.

3. The overload protection circuit of claim 2 further comprising a fusing means connected between said second side of said first switch and said load, said fusing means configured to open when said first switch fails in an on mode during said over current condition.

4. The overload protection circuit of claim 1 wherein said second switch has an impedance value such that at least 50% of the downstream over current is diverted to ground.

5. The overload protection circuit of claim 1 wherein said control module comprises a solid state power controller trip engine connected to a command input, said solid state controller trip engine generating said at least one signal in response to a signal received at said command input.

6. The overload protection circuit of claim 1 further comprising an inverter receiving said at least one signal as input and generating an inverted output coupled to said second switch.

7. A method of protecting an electrical power distribution system comprising:
   receiving a command to open or close a first switch, said first switch being connected between a source of electrical power and a load;
   determining if an over-current situation is present by determining if a current sense signal exceeds a predetermined threshold;
   closing said first switch and opening a second switch when both the received command is a close command and the over-current situation is not present;
   repeating said determining if an over-current situation is present while said first switch is closed and said second switch is open until an overload situation is determined to be present;
   opening said first switch and closing said second switch when said received command is a close command and an over-current situation is present;
   opening said first switch and closing said second switch if said received command is an open command; and
   repeating said opening said first switch and closing said second switch until said received command is a close command.

8. The method of claim 7 wherein opening said first switch comprises generating a gate drive signal to said first switch causing said first switch to open.

9. The method of claim 8 wherein closing said second switch comprises inverting said gate drive signal and transmitting said inverted gate drive signal to said second switch causing said second switch to close.

10. A leakage current protection circuit comprising:
    a solid state power controller connected to a source of electrical power and having an output, said solid state power controller having an ON state and an OFF state, wherein the electrical power is transferred to said output during said ON state and wherein a leakage current is transferred to ground potential during said OFF state;
    the ON and OFF state of the solid state power controller being determined by operation of a trip-engine controller that is responsive to over-current conditions in a feeder wire connected to the output;
    a switch connected between said solid state power controller output and said ground potential, said switch having an ON state and an OFF state; and
    the trip-engine controller coupled to said switch and causing said switch to be in said ON state whenever said solid state power controller is in said OFF state, wherein said leakage current from said solid state power controller passes through said switch to said ground potential.

11. The leakage current protection device of claim 10 further comprising a load connected between said solid state power controller output and said ground potential, whereby said switch prevents said leakage current from reaching said load.

12. The leakage current protection device of claim 10 further comprising a fusing means connected between said solid state power controller output and said switch, said fusing means being configured to open during an overload situation if said solid state power controller fails in said ON state.

13. The leakage current protection device of claim 10 wherein said solid state power controller comprises a current sensor generating a signal proportional to a current passing through said solid state power controller when in said ON state, an over current situation being determined by said solid state power controller when said signal exceeds a predetermined threshold.

14. The leakage current protection device of claim 13 wherein said controller causes said switch to be in an OFF state whenever said solid state power controller is in an ON state, except that when said overload situation exists said solid state power controller will cause said switch to be in an ON state.

* * * * *